United States Patent [19]
Ogata et al.

[11] Patent Number: 5,648,971
[45] Date of Patent: Jul. 15, 1997

[54] COMMUNICATION APPARATUS PROVIDING IMPROVED INFORMATION ON THE STATES OF DATA CHANNELS

[75] Inventors: Yukihiko Ogata, Kawasaki; Takuji Nakatsuma, Machida, both of Japan

[73] Assignee: Canon Kabushiki Kaisha, Tokyo, Japan

[21] Appl. No.: 476,027

[22] Filed: Jun. 7, 1995

Related U.S. Application Data

[62] Division of Ser. No. 369,271, Jan. 5, 1995, which is a continuation of Ser. No. 968,466, Oct. 29, 1992, abandoned, which is a continuation of Ser. No. 582,785, Sep. 17, 1990, abandoned, which is a continuation of Ser. No. 151,309, Feb. 1, 1988, abandoned.

[30] Foreign Application Priority Data

| Feb. 10, 1987 | [JP] | Japan | 62-29034 |
| Feb. 10, 1987 | [JP] | Japan | 62-29037 |
| Feb. 10, 1987 | [JP] | Japan | 62-29038 |
| Feb. 13, 1987 | [JP] | Japan | 62-31191 |
| Feb. 13, 1987 | [JP] | Japan | 62-31192 |
| Feb. 14, 1987 | [JP] | Japan | 62-31868 |

[51] Int. Cl.[6] .................. H04Q 11/04; H04M 11/00
[52] U.S. Cl. .................. 370/421; 370/524; 379/164; 379/93.17
[58] Field of Search ............... 370/58.1, 58.2, 370/58.3, 62, 68.1, 85.1, 85.2, 85.3, 95.1, 110.1, 110.2, 110.3; 379/93, 94, 96, 100, 219, 220, 227, 228, 251, 252, 268, 372, 373, 374, 376, 164, 165; 340/825.06, 825.07, 825.16, 825.17, 825.36

[56] References Cited

U.S. PATENT DOCUMENTS

| 3,951,248 | 4/1976 | Feiner et al. | 379/164 |
| 3,956,595 | 5/1976 | Sobanski | 379/204 |
| 4,209,668 | 6/1980 | Weinberger et al. | 379/188,4,296,282 |
| ........ | 10/1981 | O'Neil et al. | 379/164 |
| 4,519,072 | 5/1985 | Fechalos et al. | 370/522 |
| 4,567,324 | 1/1986 | Smith et al. | 379/210 |
| 4,626,627 | 12/1986 | Van Gilluwe et al. | 379/214 |
| 4,636,589 | 1/1987 | Lee | 379/159 |
| 4,672,662 | 6/1987 | Nishino et al. | 370/95.1 |

(List continued on next page.)

FOREIGN PATENT DOCUMENTS

| 0060517 | 11/1982 | European Pat. Off. . |
| 0066668 | 12/1982 | European Pat. Off. . |
| 0178111 | 1/1985 | European Pat. Off. . |
| 0164611 | 12/1985 | European Pat. Off. . |
| 0224212 | 6/1987 | European Pat. Off. . |
| 0291307 | 11/1988 | European Pat. Off. . |
| 3437540 | 4/1986 | Germany . |
| 0114954 | 7/1984 | Japan . |
| 2106354 | 3/1983 | United Kingdom . |
| 2132054 | 6/1984 | United Kingdom . |

OTHER PUBLICATIONS

Ericsson Review, vol. 61 pp. 14–19, May 1984, "Voice and data workstations and services in the ISDN", Ericsson et al.

Proc. National Communications Forum, vol. 40, part I, 1986, pp. 596–604, "Basic rate interface capabilities to support ISDN terminals", Chriss et al.

Proc. Int. Switching Symposium, May 7–11, 1984, "Implementation and experience of ISDN in AXE", Como et al.

Philips Telecommunication Review, vol. 43, No. 2, Jun. 1985, pp. 150–163, Hesdahl, "Digital voice/data terminals and data–terminal adaptors".

(List continued on next page.)

*Primary Examiner*—Alpus H. Hsu
*Attorney, Agent, or Firm*—Fitzpatrick, Cella, Harper & Scinto

[57] ABSTRACT

In a communication system having a plurality of communication apparatus connected to at least one line, each communication apparatus has detection circuitry for detecting a call signal from the line to other communication apparatus and inform circuitry for informing such call or circuitry for altering such call to a call to its own apparatus.

44 Claims, 13 Drawing Sheets

U.S. PATENT DOCUMENTS

| | | | |
|---|---|---|---|
| 4,694,483 | 9/1987 | Cheung | 379/34 |
| 4,722,082 | 1/1988 | Furuya et al. | 370/463 |
| 4,723,273 | 2/1988 | Diesel et al. | 379/211 |
| 4,740,955 | 4/1988 | Litterer et al. | 370/85.11 |
| 4,792,800 | 12/1988 | Fujioka et al. | 340/825.05 |
| 4,888,766 | 12/1989 | Ogasawara | 370/95.1 |
| 4,995,073 | 2/1991 | Okata et al. | 379/94 |
| 5,073,922 | 12/1991 | Okada | 379/164 |
| 5,142,525 | 8/1992 | Nakatsuma | 370/110.1 |
| 5,245,651 | 9/1993 | Takashima et al. | 379/96 |
| 5,280,520 | 1/1994 | Abe | 379/100 |

OTHER PUBLICATIONS

Philips Telecommunications Review, vol. 44, No. 1, Aug. 1986, pp. 26–35, van Kleef, "The computer voice (VPU) assisting PABX operators etc.".

Int. Symp. Subscriber Loops and Services, Tokyo, Sep. 1986, pp. 150–155, Fujioka et al., "Integrated call control and ISDN basic access etc.".

Pat. Abs. Jp. vol. 7, No. 76, Mar. 30, 1983 (JP-A-583453).

Pat. Abs. Jp. vol. 10, No. 113, Apr. 26, 1986 (JP-A-60248096).

NTZ Nachrichtentechnische Zeitschrift, vol. 40, No. 1, Jan. 1987, pp. 46–50, Wagner, "ISND-Endgerate etc.".

Pat. Abs. Jp. vol. 10, No. 223, Aug. 13, 1986 (JP-A-6166455).

Third Int. Network Planning Symp. "Networks 86", pp. 67–73, Polanco et al. ISDN Numbering and Interworking.

Data Communications, vol. 16, No. 11, Oct. 1987, pp. 237–255, "standards makers cementing ISDN subnetwork layers".

Electrical Design News, vol. 32, No. 2, Jan. 22, 1987, pp. 167–174, O'Toole "ISDN terminals simplify data transmissions".

Nachrichtentechnik Electronik, vol. 37, No. 10, 1987, pp. 368–374, Winkler et al., "ISDN–Konzept".

COMMUNICATION APPARATUS PROVIDING IMPROVED INFORMATION ON THE STATES OF DATA CHANNELS

This application is a division of application Ser. No. 08/369,271 filed on Jan. 5, 1995, which is a continuation of prior application Ser. No. 07/968,466 filed on Oct. 29, 1992, now abandoned, which is a continuation of prior application Ser. No. 07/582,785 filed on Sep. 17, 1990, now abandoned, which is a continuation of prior application Ser. No. 07/151,309 filed on Feb. 1, 1988, now abandoned.

BACKGROUND OF THE INVENTION

1. Field of the Invention

The present invention relates to a communication apparatus used in a communication system having a plurality of communication terminals connected to at least one line.

2. Related Background Art

As the communication system of this type, an ISDN (integrated services digital network) has been known. Up to eight terminals can be connected to the ISDN line. The ISDN line has three communication channels, that is, two data channels (B channels) and one control channel (D channel) and up to eight channels are connected to the line. When the communication channel is not busy, it can communicate in response to a communication request from a terminal.

In the ISDN, a common address which is common to all terminals and sub-addresses given to respective terminals are used. When terminals are to be called, if only the common address is designated, all terminals are called and one of them is connected. If a sub-address is designated in addition to the common address, only the terminal of the designated address is called.

Where a small number of lines are shared by a plurality of terminals like in the ISDN system, a terminal may not communicate if the line is busy. Whether it can communicate or not is not known until it issues a communication request.

In the ISDN system, if the terminal is designated by the sub-address, only the designated terminal is called. If the terminal corresponding to the sub-address is busy or no such terminal exists, an operator who tries to connect to the line must again designate the common address and recall.

SUMMARY OF THE INVENTION

It is an object of the present invention to improve a communication apparatus.

It is another object of the present invention to solve the above problems.

It is a further object of the present invention to provide a communication apparatus for a communication system having a plurality of communication apparatus connected to at least one communication line, which communication apparatus can inform a call to other communication apparatus.

It is still a further object of the present invention to provide a communication apparatus for the communication system described above, which alters a call to other communication apparatus to a call to its own apparatus so that it can respond to the call to other communication apparatus.

It is a further object of the present invention to provide the communication system described above which enables reservation of communication.

It is still a further object of the present invention to inform whether communication is permitted or not in accordance with a communication request.

It is another object of the present invention to provide the communication system described above which permit alteration of a call to a particular communication apparatus.

It is a further object of the present invention to provide the communication system described above which can inform usage status of a communication line.

Other objects of the present invention will be apparent from the following description of the preferred embodiments.

DETAILED DESCRIPTION OF THE PREFERRED EMBODIMENTS

Now the present invention will be clarified in detail by embodiments thereof shown in the attached drawings.

In the following embodiments, an ISDN (integrated services digital network) is illustrated.

Figure 1:
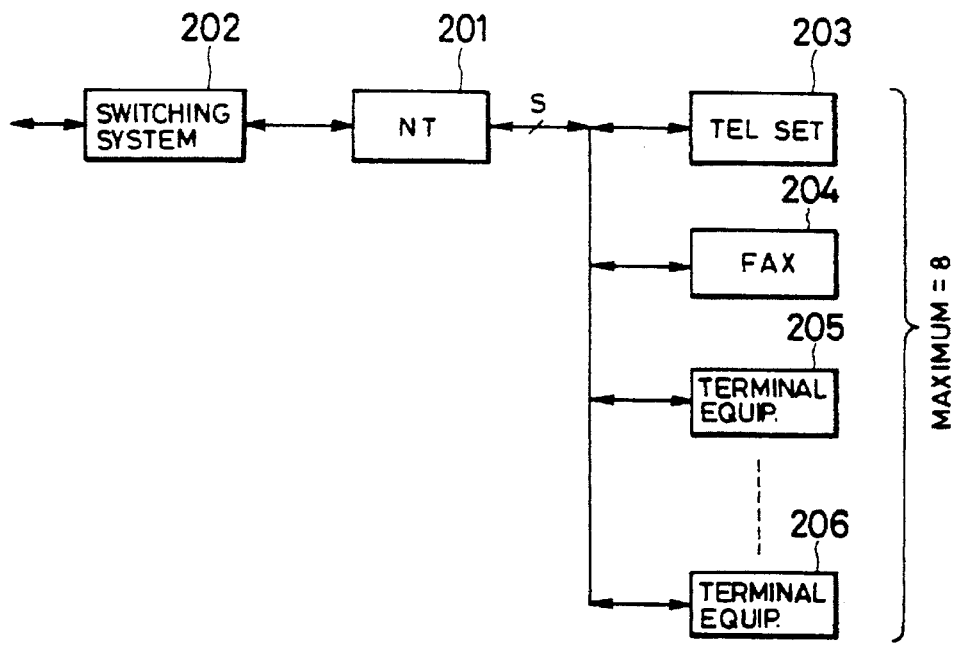
FIG. 1 shows a system configuration in which a communication apparatus in accordance with one embodiment is connected to an ISDN line.

FIG. 1 shows a system configuration of the ISDN network.

In FIG. 1, numeral 202 denotes a switcher in the ISDN network. Numeral 201 denotes a network terminator (NT) which communicates data with the switcher 202. Numerals 203–206 denote terminals connected to the NT 201.

The ISDN network has two B channels as data channels and one D channel as a control channel. The NT 201 has an address assigned thereto, and the terminals 203–206 have respective sub-addresses assigned thereto.

When data is to be received, the switcher 202 responds to address information designated by the transmission requesting station to call the NT 201 through the D channel. If the address is designated by the requesting station, the NT 201 calls the designated sub-address terminal on the condition that it is not busy. If the sub-address is not designated by the requesting station, the NT 201 calls all non-busy terminals and connects a non-busy channel to the terminal which has first responded.

When data is to be transmitted, if the terminal designates an address of the destination station through the D channel, the NT 201 sends address information through the D channel if there is a non-busy channel, to call the destination station.

The terminals connectable to the ISDN include digital telephone set, facsimile machine, telex and other communication terminals.

In a first embodiment, a called sub-address is displayed.

Figure 2:
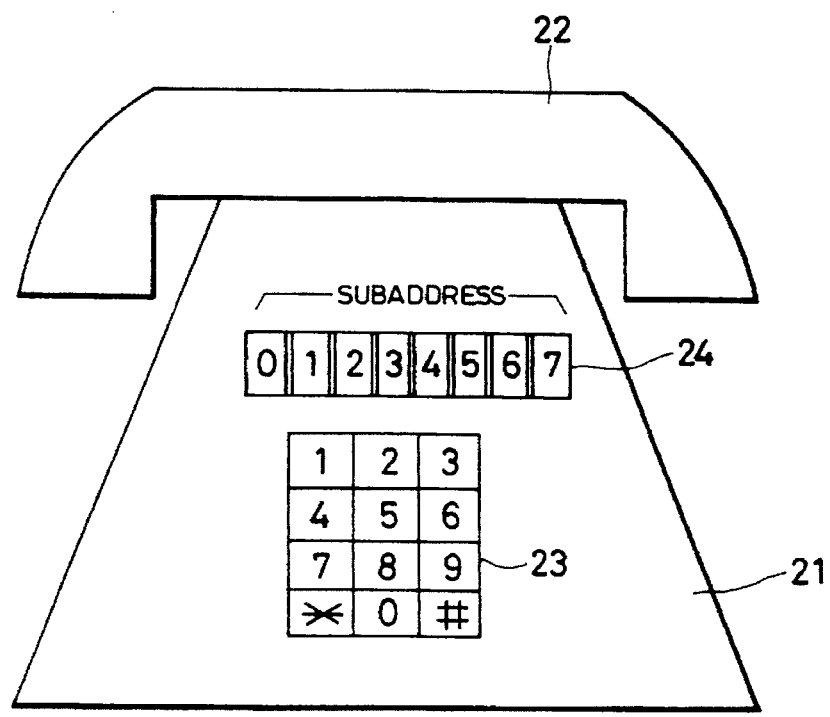
FIG. 2 shows an external view of a digital telephone set of the first embodiment.

FIG. 2 shows an external view of a digital telephone set of the first embodiment. Numeral 21 denotes a digital telephone set body, numeral 22 denotes a handset, numeral 23 denotes key buttons for inputting a telephone number and numeral 24 denotes lamps for indicating a called sub-address.

Figure 3:
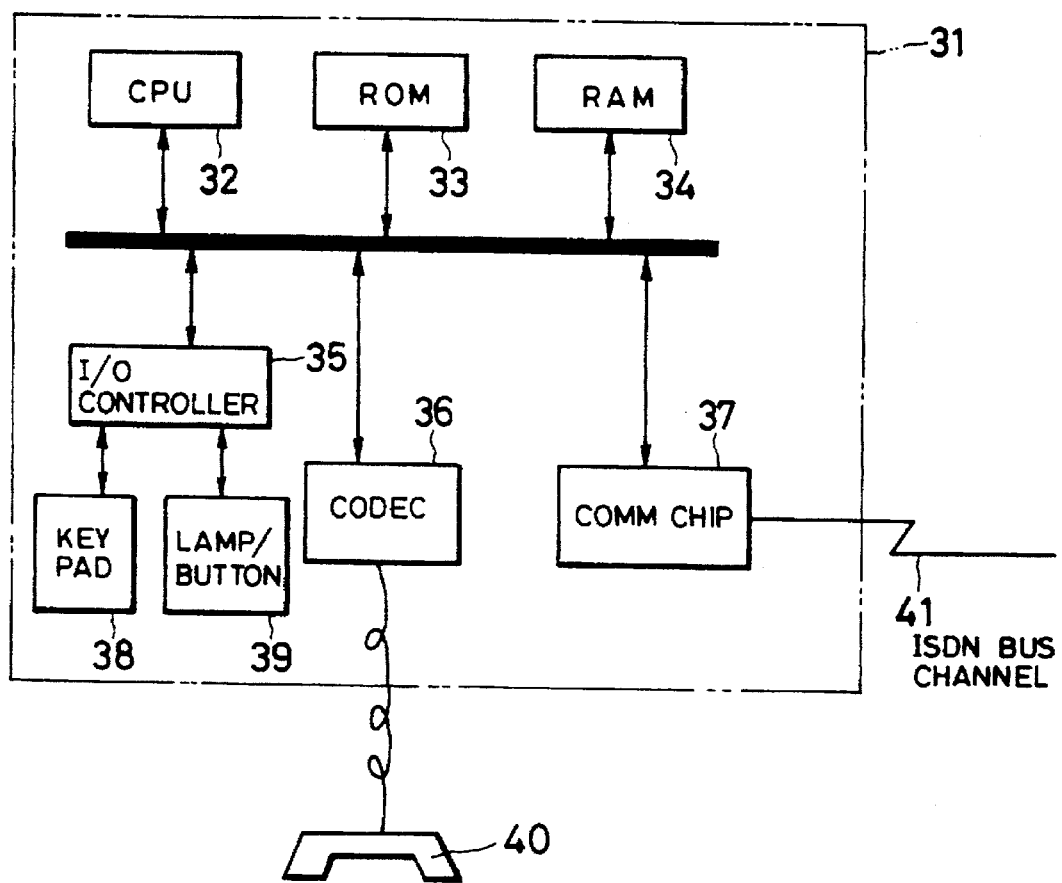
FIG. 3 shows a block diagram of the digital telephone set of the first embodiment.

FIG. 3 shows a block diagram of the digital telephone set of the first embodiment.

The present embodiment comprises a digital telephone set body 31 and a handset 40 which is a communication transmitter/receiver. The digital telephone set body 31 comprises a CPU 32, a ROM 33, a RAM 34, a communication channel 37, an I/O controller 35, a codec 36 for analog-digital conversion, a key pod 38 and a lamp/button 39. The CPU 32 controls the digital telephone set body 31. The ROM 33 contains a control program according to a flow chart shown in FIG. 5, and the RAM 34 stores communication data.

Figure 4:
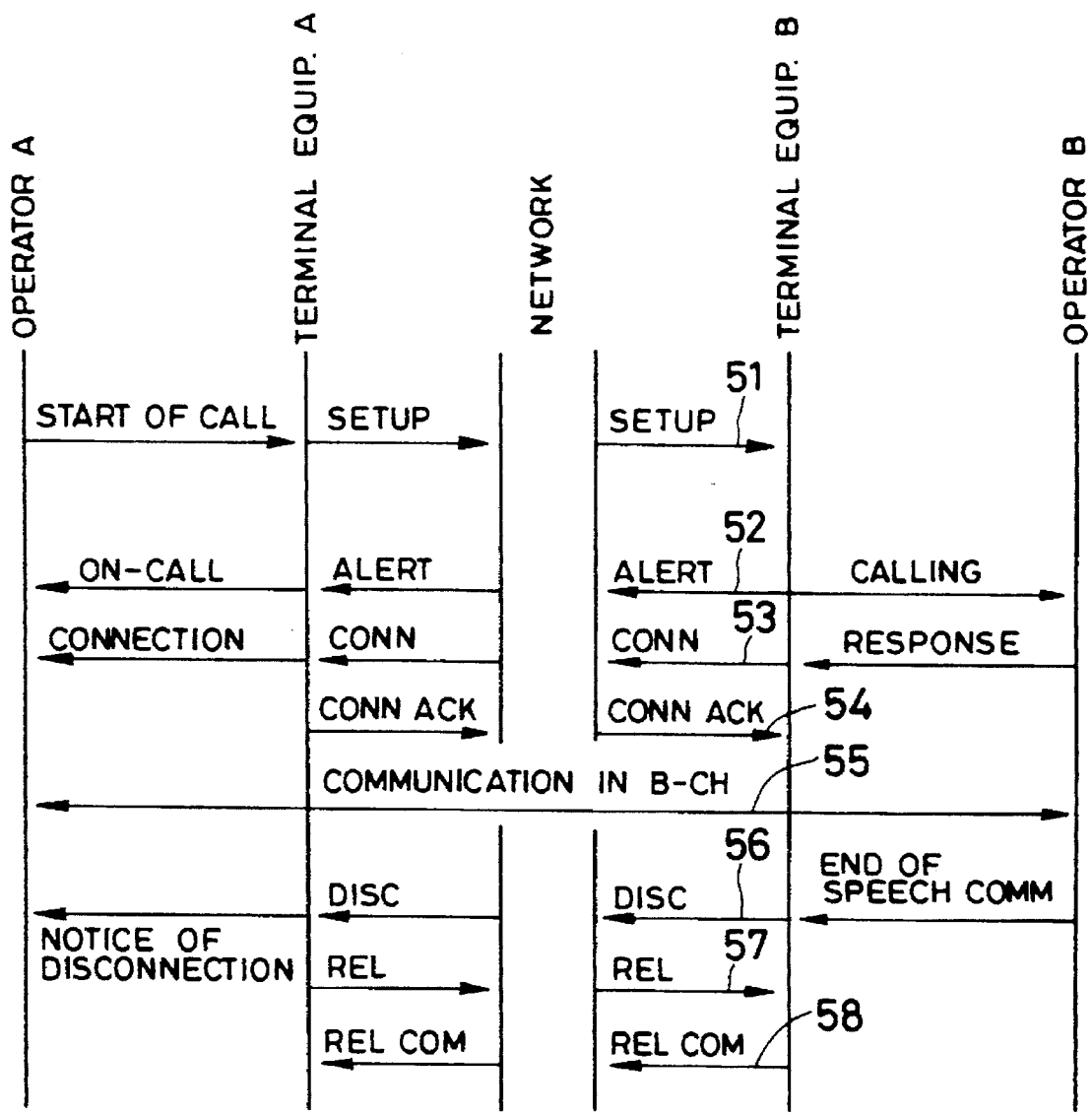
FIG. 4 shows a signal sequence of the digital telephone set of the first embodiment.

FIG. 4 shows a signal sequence of the digital telephone set in the ISDN network. In a called terminal B of FIG. 4, numeral 51 denotes a call request command (SETUP), numeral 52 denotes a calling command (ALERT), numeral 53 denotes a respond command (CONN), numeral 54 denotes a connection completion command (CONN ACK), numeral 55 denotes speech data (B-CH signal), numeral 56 denotes a disconnection command (DISC), numeral 57 denotes a recovery request command (REL) and numeral 58 denotes a recovery confirmation command (REL COM).

The control operation of the CPU 32 of the digital telephone set of the first embodiment is explained.

Figure 5:
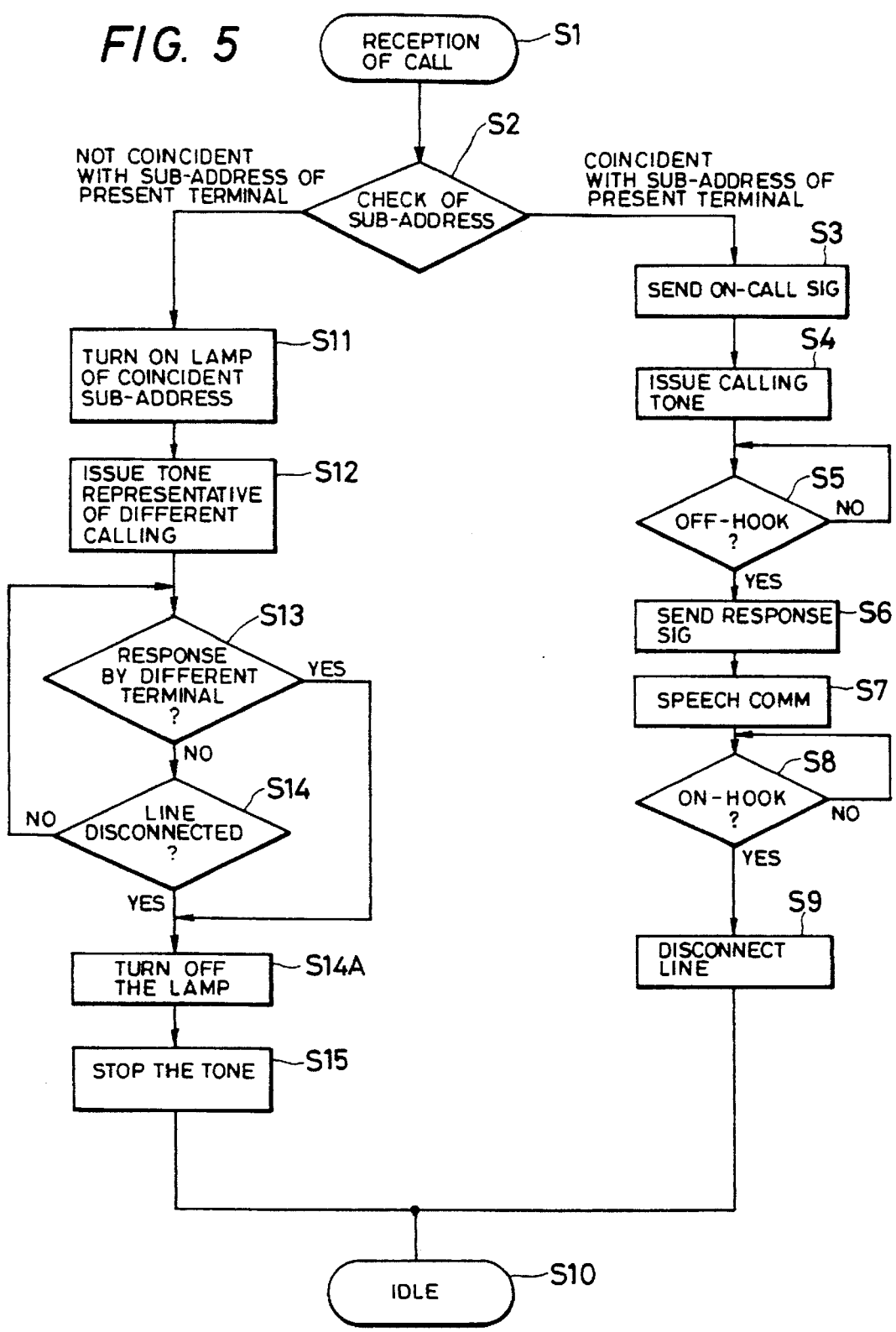
FIG. 5 shows a flow chart of a control operation of the digital telephone set of the first embodiment.

FIG. 5 shows a flow chart of the control operation of the CPU 32 of the first embodiment. When the NT 201 of FIG. 1 receives a call, the setup command (SETUP) 51 of FIG. 4 is sent to all terminals connected to the bus, through the bus line S of FIG. 1. The SETUP command 51 includes a sub-address and information on type of service of the call. In a step S1 of FIG. 5, if the terminal receives the SETUP command 51, it checks in a step S2 whether the sub-address contained in the SETUP command 51 as a parameter is equal to the sub-address of its own. If they are equal, it sends a calling signal (52 in FIG. 4) in a step S3, and rings a calling bell in a step S4 to inform to an operator of the call. In a step S5, the operator's response is confirmed. If the operator's response is confirmed, the acknowledge command (53 in FIG. 4) is sent in a step S6. When the connection completion command 54 is received, speech is started in a step S7 (55 in FIG. 4). In a step S8, end of operator's speech is confirmed. In a step S9, the disconnection command (56 in FIG. 4) is sent and the recovery request command (57 in FIG. 4) is received and the recovery confirmation command (REL COM 58 in FIG. 4) is sent. Thus, the terminal becomes idle in a step S10 and the communication terminates.

In the step S2, if the sub-address contained in the SETUP command 51 as the parameter is not equal to the sub-address owned by the terminal, the lamp 24 in FIG. 2 of the corresponding sub-address is turned on in a step S11. In a step S12, a calling sound to indicate the call to other terminal is generated to inform it to the operator. In a step S13, whether the other terminal has responded to the call or not is checked, and in a step S14, whether the line has been disconnected or not is checked. If the decision in the step S13 or S14 is YES, the sub-address indication lamp is turned off in a step S14A and the calling tone for the other terminal is stopped in a step S15. Thus, the terminal becomes idle in the step S10.

In the present embodiment, if the address contained in the SETUP command as the parameter is not equal to the sub-address of the terminal, the steps S11 et seq. of FIG. 5 are carried out. Alternatively, when the sub-addresses are not equal, the steps S11 et seq. may be carried out only when the type of service contained in the parameter of the SETUP command 51 and the type of service owned by the terminal are equal and other call may be ignored.

In the present embodiment, the call of the sub-address of other terminal is indicated by the lamp, although it may be displayed by characters by using a LCD.

The signal sequence may be different than that shown in FIG. 4 so long as the called terminal is designated by the sub-address.

As described above, when the digital telephone set of the ISDN network receives a call to other terminal connected thereto through the bus, the called sub-address is indicated by the lamp so that the operator of that terminal can know the call to the other terminal.

A second embodiment in which a call to other communication apparatus is altered to the one to its own apparatus is explained. The configuration of the second embodiment is similar to that of the first embodiment shown in FIGS. 2 to 4 but a control operation is different.

Figure 6:
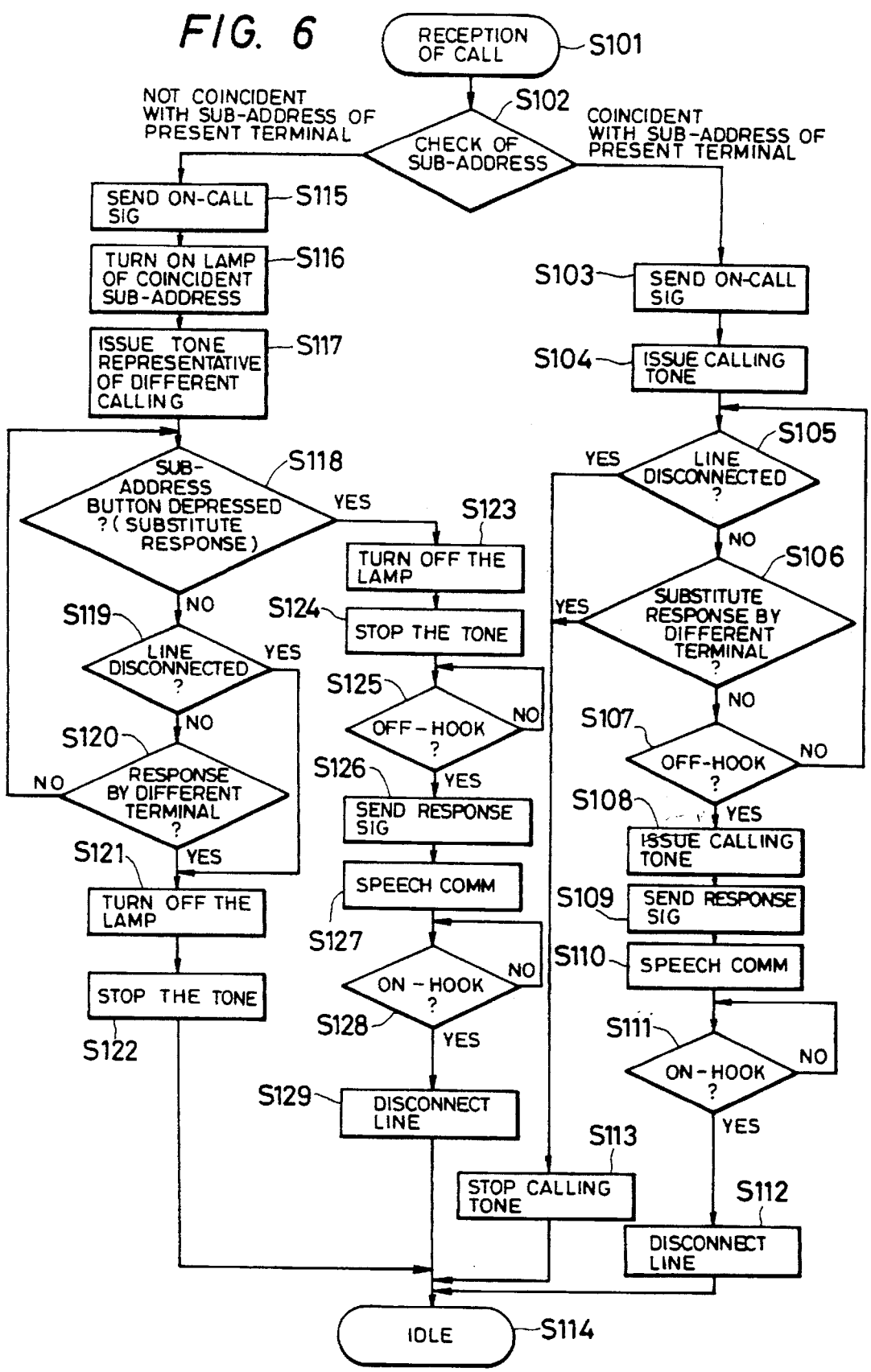
FIG. 6 shows a flow chart of a control operation of a digital telephone set of a second embodiment.

FIG. 6 shows a flow chart of a control operation of the CPU 32 of the digital telephone set of the second embodiment. The second embodiment is now explained with reference to the flow chart of FIG. 6.

When the NT 201 of FIG. 1 receives a call, the SETUP command 51 of FIG. 4 is sent to all terminals connected to the bus through the bus line S of FIG. 1. The SETUP command 51 includes a sub-address and information on the type of service of the call. This is similar to the first embodiment. In a step S101 of FIG. 6, when the terminal receives the SETUP command, the sub-address contained in the SETUP command as the parameter is compared with the sub-address owned by the terminal in a step S102. If they are equal, a calling signal (52 in FIG. 4) is sent in a step S103 and a calling sound (bell) is generated in a step S104 to inform to the operator of the call. In a step S105, whether the line has been disconnected by the calling station or not is checked. In a step S106, whether other terminal has responded on behalf of its own terminal or not is checked. In a step S107, whether the operator has hooked off the handset or not is checked. If the decision in the step S105 or S106 is YES, the terminal becomes idle in a step S114. If the off-hook by the operator is detected in the step S107, the calling sound is stopped in a step S108 and the acknowledge command 53 of FIG. 4 is sent to the network in a step S109. When the connection completion command 54 of FIG. 4 is received, the speech mode is started in a step S110 (55 in FIG. 4). After the terminal entered into the speech mode and when the on-hook of the handset by the operator is detected in a step S111, the disconnection command (56 in FIG. 4) is sent in a step S112 and the recovery request command 57 of FIG. 4 is received. Then, the recovery confirmation command 58 of FIG. 4 is sent and the line is disconnected, and the terminal becomes idle in the step S114.

In the step S102, if the sub-address contained in the SETUP command 51 as the parameter is "3", for example, and the sub-address owned by the terminal is "1", it is determined in the sub-address check that the call is not to its own terminal. Thus, in a step S115, the calling signal 52 of FIG. 4 is sent. In a step S116, the lamp 24 of FIG. 2 corresponding to the sub-address 3 is turned on. In a step S117, the call to other terminal is informed. It may be informed to the operator of its own terminal by generating the calling sound.

In a step S118, whether the operator has depressed the sub-address button 24 (which also functions as the sub-address indication lamp) of FIG. 2 to respond to the call on behalf of the other terminal is checked. In a step S119, whether the line has been disconnected by the network or not is checked. In a step S120, whether other terminal has responded or not is checked. If the decision in the step S119 or S120 is YES, the sub-address indication lamp is turned off in a step S121, the calling tone to the other terminal is stopped in a step S122, and the terminal becomes idle in the step S114.

In the step S118, if it is detected that the operator has depressed the sub-address button to respond on behalf of the other terminal, the sub-address button is turned off in a step S123, and the calling tone to the other terminal is stopped in a step S124.

In a step S125, the off-hook by the operator is checked. If the off-hook is detected, the response command 53 of FIG. 4 is sent to the network in a step S126. When the connection completion command 54 of FIG. 4 is received, the speech mode is started in a step S127 (55 in FIG. 4). After the terminal entered into the speech mode and when the on-hook of the handset by the operator is checked in a step S128, the disconnection command (56 in FIG. 4) is sent in a step S129 and the recovery request command 27 of FIG. 4 is received. Then, the recovery confirmation command 28 of FIG. 4 is sent and the line is disconnected, and the terminal becomes idle in the step S114.

In the present embodiment, if the sub-address owned by its own terminal and the sub-address contained in the parameter of the SETUP command are not equal, the steps S115 et seq. of FIG. 6 are carried out. Alternatively, when the sub-addresses are not equal, the steps S115 et seq. of FIG. 6 may be carried out only when the type of service owned by its own terminal and the type of service contained in the SETUP command 51 are equal, and other call may be ignored. During the looping in the steps S105–S107 and S118–S120 of FIG. 6, if there is another call, it may be parallelly processed from the step S101 so that more than one calls are processed.

The signal sequence may be different than that shown in FIG. 4 so long as the called terminal is designated by the sub-address.

As described above, since the digital telephone set for the ISDN network is provided with the function of dynamically altering the sub-address owned by its own terminal in response to the operator's instruction, the call to any ISDN terminal connected with its own terminal through the bus can be responded by its own terminal.

A third embodiment in which usage status of the communication channel is informed by voice (monitored) is explained.

Figure 7:
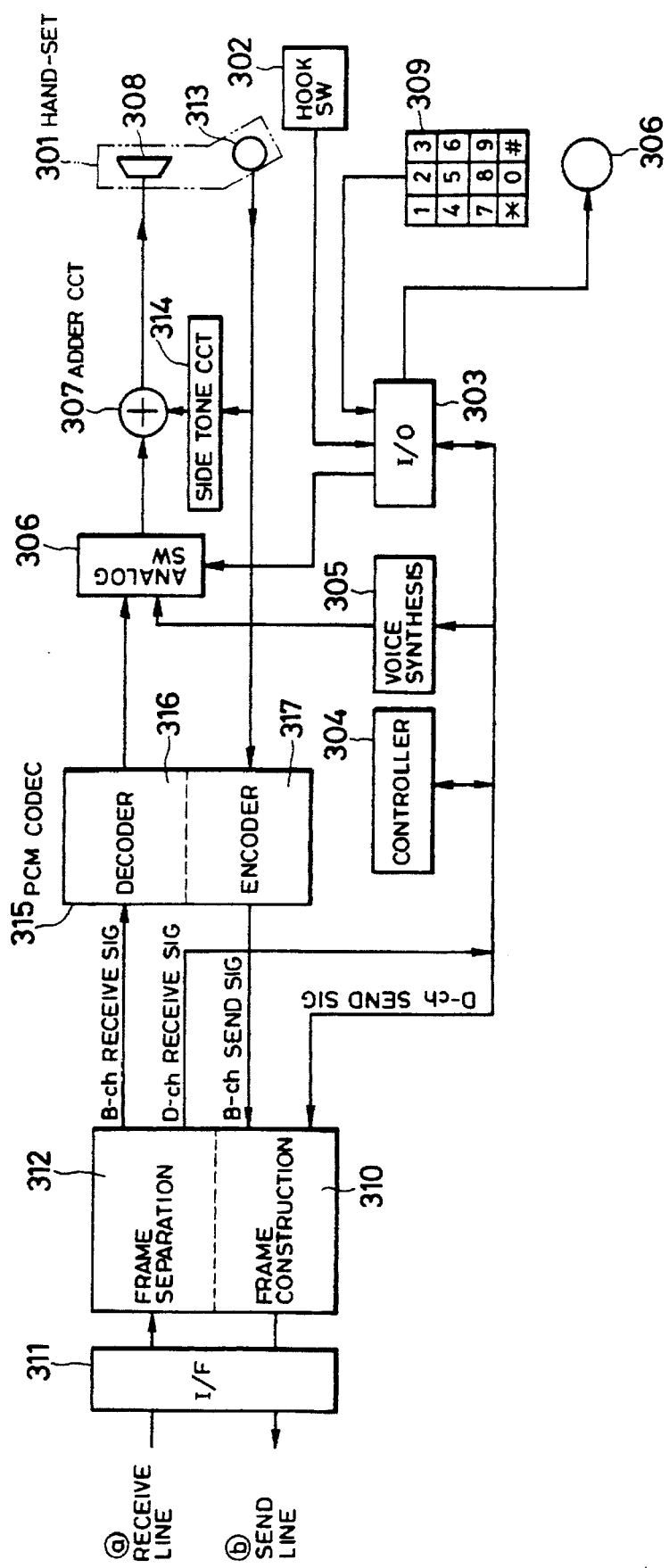
FIG. 7 shows a block diagram of a telephone set of a third embodiment.

FIG. 7 shows a configuration of a telephone set having a line monitor function of the third embodiment.

When a user hooks off a handset 301, a hook switch 302 is turned on and it is informed to a control unit 304 through an I/O port 303.

The control unit 304 starts a preparatory operation for calling. It converts a calling request command to a D channel transmission signal and sends it to a framing circuit 310, which frames it into a 2B+D channel basic access signal, which is sent to the NT 201 of FIG. 1 through an interface circuit 311. The NT 201 examines the usage status of the equipments connected to the NT 201, and if there is no trouble, it informs it through the D channel and a receive line ⓐ. The control unit 304 informs this information to a voice synthesis circuit 305 as a command and switches an analog switch 306 to select to voice synthesis circuit 305, through the I/O port 303. The voice synthesis circuit 305 generates a first sound signal which is sent to a speaker 308 through an adder 307. The first sound signal may be a 400 Hz continuous sound so that there is no feeling of difference compared to a conventional domestic analog telephone set.

If the B channel is busy because other equipment than the telephone set under consideration uses the line, it is informed to the control unit 304 by the NT 201 through the same route as that explained above. In this case, the voice synthesis circuit 305 generates a voice message signal indicating that the line is busy with other equipment, and it is supplied to the speaker 308.

When the user hears the first sound to recognize that the telephone set is in the preparatory operation for calling, and enters the number of the partner by a dial key 309.

The input dial number is sent to the control unit 304 through the I/O port 303.

The control unit 304 converts the number to a D channel transmission signal, which is sent to the NT 201 through the framing circuit 310, the interface circuit 311 and a transmission line ⓑ.

Since the NT 201 sends the dial number to the switcher 202, it is finally connected to the partner telephone set. During this period, the control unit 304 sends a command to the voice synthesis circuit 305 to cause it to generate a pseudo-calling signal, which is supplied to the speaker 308 so that the user waits for the connection.

If the dial number of the partner is wrong or the line of the partner is busy with other equipment than the telephone set, it is informed to the control unit 304 by the NT 201 of FIG. 1 so that the information is informed to the user as a voice message to request to the user to hook on the handset 301.

When the partner hooks off the handset, the speech mode is started. The voice signal inputted from a microphone 313 of the handset 301 is supplied to an encoder 317 of a PCM codec 315 where it is PCM-coded. Then, it is converted to a B channel transmission signal, which is supplied to the framing circuit 310. The framing circuit 310 converts the B channel signal to the 2B+D channel basic access unit, which is sent to the NT 201 through the interface circuit 311. A side tone circuit 314 and the adder 307 are provided to impart natural feeling in the speech. They return a portion of sound generated by the user to generate a side tone.

On the other hand, the speech signal of the partner is converted to a B channel receive signal by a deframing circuit 312. It is a PCM code which is converted to an analog voice signal by a decoding circuit 316 of the PCM codec 315. In the speech mode, the analog switch 306 is switched to select the voice synthesis circuit 315 under the control of the control unit 304 so that the decoded voice signal is supplied to the speaker 308 through the adder 307.

The calling operation has been described so far. The call receiving operation is now explained.

When the call is received, the information thereof is supplied from the NT 201 through the D channel. It is informed to the control unit 304 through the receive line (a), the interface circuit 311 and the deframing circuit 312. The control unit 304 determines whether the call is to the telephone set or not, and if it is, it causes the bell 306 to ring through the I/O circuit 303.

On the other hand, if the call is to other equipment than the telephone set, the telephone set does not respond to it. When the user hooks off the handset 301 in response to the bell 306, the hook switch 302 is turned on and it is informed to the control unit 304 through the I/O circuit 303. When the control unit 304 detects the response by the user, it informs to the framing circuit 310 through the D channel transmission signal that the telephone set enters into the speech mode. This information is informed to the NT 201 through the interface circuit 311. The control unit 304 switch the analog switch 306 to select the PCM codec 315, through the I/O circuit 303. Thus, the speech mode is ready.

The following operation in the speech mode is same as that of the calling operation.

In the present embodiment, the first sound signal and the calling signal are generated by the voice synthesis circuit. Alternatively, those signals may be voice messages.

In accordance with the third embodiment, various information (for example, line status) supplied by the NT 201 through the D channel are supplied to the user in the form of voice message which is very easy to understand. Accordingly, the operability of the telephone set is considerably improved.

A fourth embodiment in which communication is reserved and availability of communication to the reserved communication is informed is explained.

Figure 8:
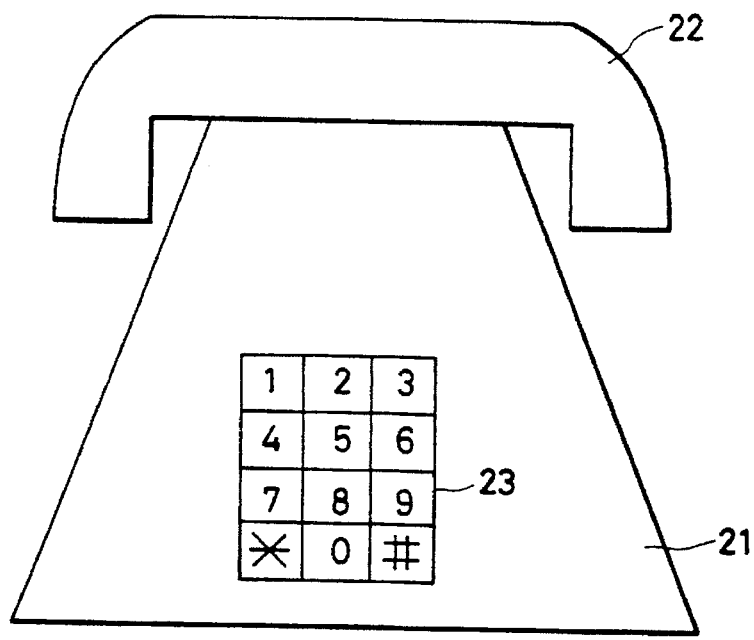
FIG. 8 shows an external view of a digital telephone set of a fourth embodiment.
Figure 9:
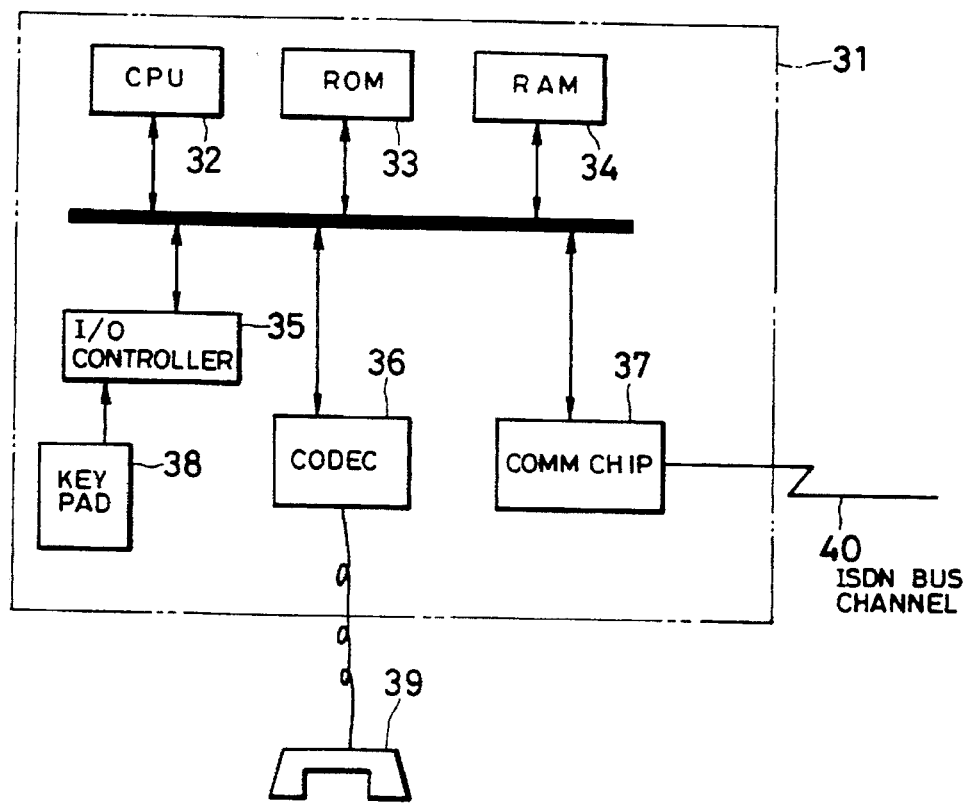
FIG. 9 shows a block diagram of the digital telephone set of the fourth embodiment.

FIG. 8 shows an external view of a digital telephone set of the fourth embodiment, and FIG. 9 shows a block diagram of a configuration of the digital telephone set. The difference in FIG. 8 from FIG. 2 is that the sub-address indication lamp (sub-address button) 24 is not provided. The difference in FIG. 9 from FIG. 3 is that the lamp/button 39 is not provided. The function of the fourth embodiment to be described later may be provided to the telephone set of the first embodiment shown in FIGS. 2 and 3.

Figure 10:
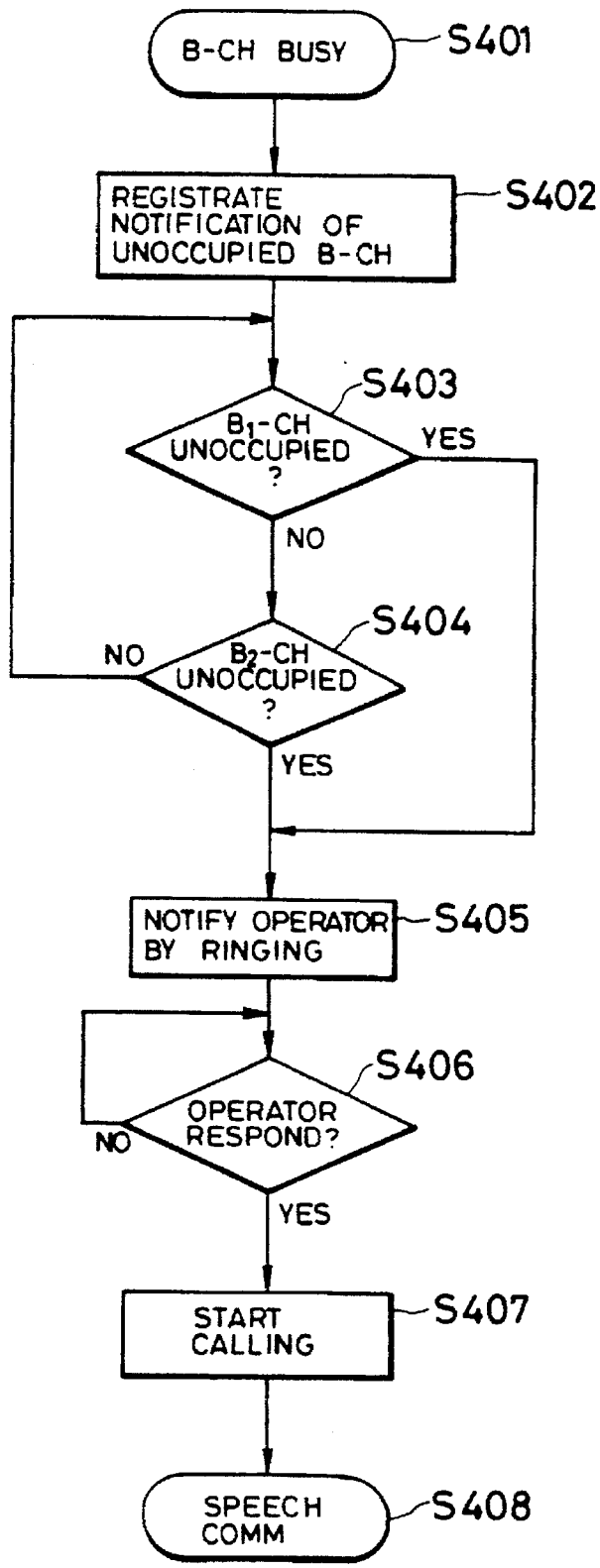
FIG. 10 shows a flow chart of a control operation of the digital telephone set of the fourth embodiment.

FIG. 10 shows a flow chart of a control operation of the CPU 32 of the fourth embodiment. The fourth embodiment is now explained with reference to the flow chart of FIG. 10.

If all B channels are busy and no calling operation is carried out in a step S401 of FIG. 10, the operator registers from the terminal a notice for B channel availability in a step S402. In the present embodiment, "99" is dialed to register the notice for B channel availability. The apparatus which has been registered by the operator for the notice for B channel availability monitors the D channel signal sequence in a step S403 to check if the B1 channel is available. In a step S404, it checks if the B2 channel is available. If the availability of the B channel is detected in the step S403 or S404, the ringing bell is rung in a step S405 to call the operator of the calling station. In a step S406, the response by the calling station operator by his/her hooking off the handset is checked. If the response by the operator is detected in the step S406, a dial tone is generated in a step S407 to inform to the operator that he/she is permitted to call. Thus, the operator calls. In a step S408, normal speech mode is started.

In the present embodiment, if all B channels are busy, the availability of B channel is informed to the operator. Alternatively, the apparatus may automatically recall when the B channel becomes available, and the connection with the called station may be informed to the operator of the calling station.

As described above, when all B channels are busy, the apparatus monitors the use status of the B channels by the request of the operator and if the B channel becomes available, it is informed to the operator. Accordingly, the work of the operator is reduced and the efficiency of line is improved.

A fifth embodiment in which the call with sub-address designation is altered to the call to all terminals of the called station if the called station does not respond to the call is explained.

The configuration of the digital telephone set of the fifth embodiment is some as that of FIGS. 8 and 9 or FIGS. 2 and 3.

Figure 11:
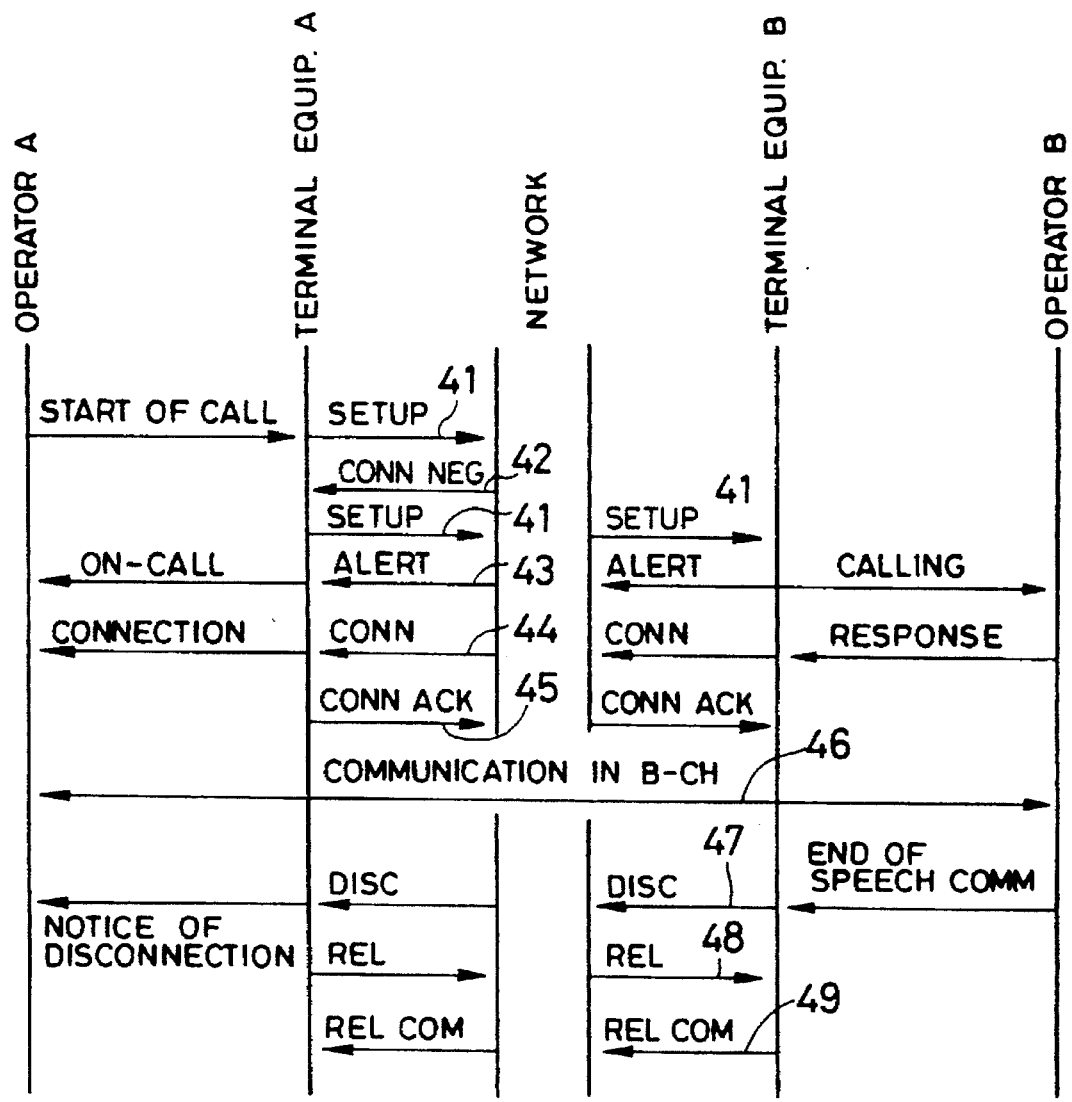
FIG. 11 shows a signal sequence of a digital telephone set of a fifth embodiment.
Figure 12:
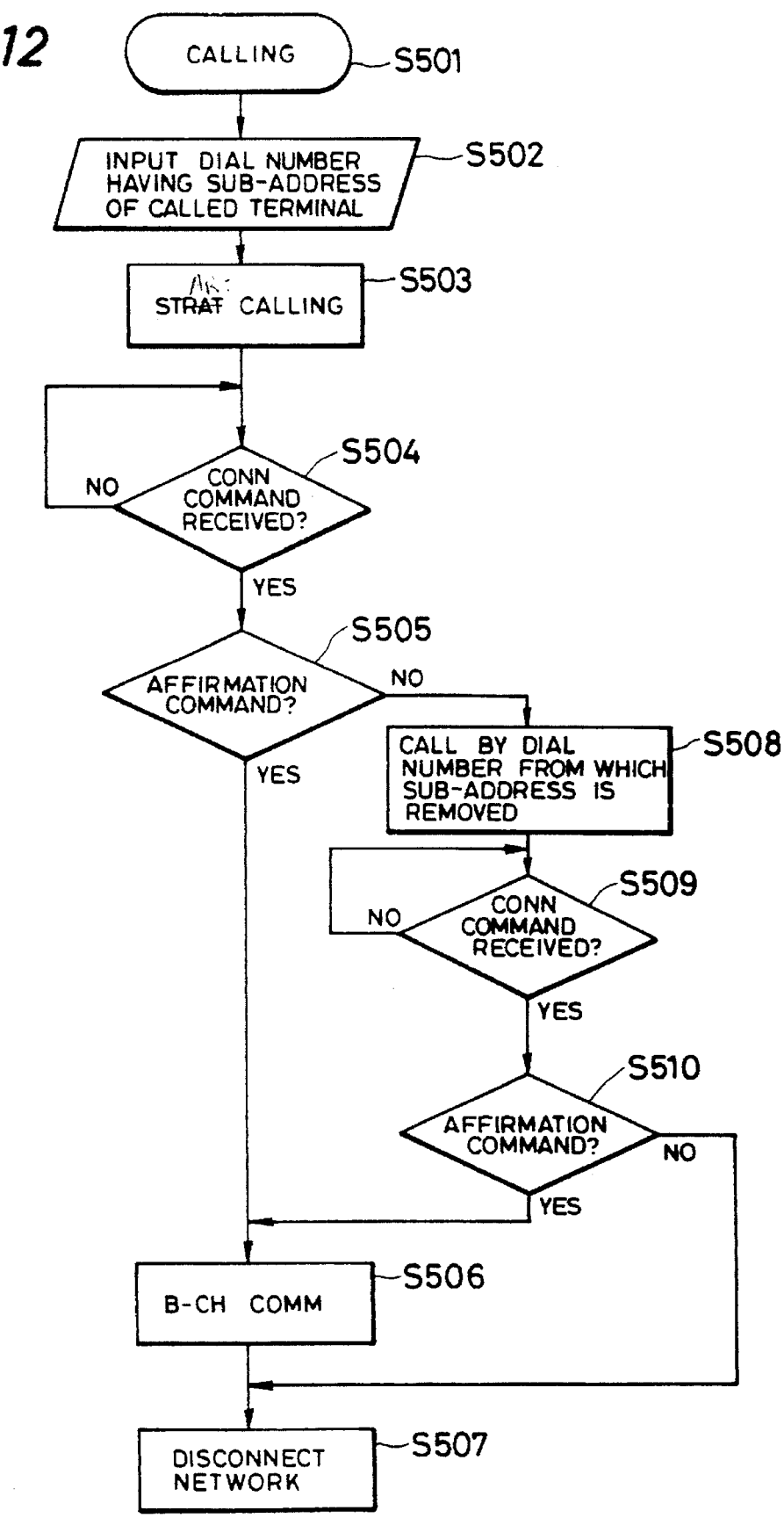
FIG. 12 shows a flow chart of a control operation of the digital telephone set of the fifth embodiment.

FIG. 11 shows a signal sequence of the fifth embodiment, and FIG. 12 shows a flow chart of a control operation of the CPU 32 of the digital telephone set of the fifth embodiment. The fifth embodiment is explained with reference to FIGS. 11 and 12.

In a called terminal B of FIG. 11, numeral 41 denotes a call request command (SET UP), numeral 42 denotes a call negate command (CONN NEG), numeral 43 denotes a calling command (ALERT), numeral 44 denotes a response command (CONN), numeral 45 denotes a connection completion command (CONN ACK), numeral 46 denotes speech data (B-CH signal), numeral 47 denotes a disconnection command (DISC), numeral 48 denotes a recovery request command (REL) and numeral 49 denotes a recovery confirmation command (REL COM).

When a call is to be made in a step S501 of FIG. 12, the operator inputs to the terminal a dial number of the called station with a sub-address in a step S502.

In a step S503, the terminal which received the dial number of the called station starts the calling operation. It sends the SET UP command 41 of FIG. 11 to the ISDN network.

In a step S504, the calling terminal waits for the reception of the CONN commands 44 and 42 of FIG. 11. When it receives the CONN command, it checks if the command is affirmative command or negative command in step S505.

If the reception of the affirmative command is detected in the step S505, the calling terminal sends the CONN ACK command 45 of FIG. 11, and the speech mode is started in a step S506 (46 in FIG. 11). When the speech terminates in a step S507 and the calling terminal receives the DISC command 47 of FIG. 11, it sends the REL command 48 and then receives the REL COM command 49. Thus, the disconnection of the network is confirmed and the communication is terminated.

In the step S505, if the negative command is received, there may be no corresponding terminal at the transmitted sub-address. Thus, in a step S508, the calling terminal automatically deletes the sub-address from the dial number of the called station input in the step S502 and send the dial number without sub-address. Then, the calling terminal waits for the reception of the CONN command in the step S509. When it receives the CONN command, it checks in a step S510 whether the command is an affirmative command or a negative command. If it is the affirmative command, the speech is started in the step S506 and the network is disconnected in the step S507.

If the negative command is received in the step S510, the network is disconnected in the step S507 to terminate the communication.

In the present embodiment, the dial number with the sub-address is sent, and if there is no corresponding terminal in the called station, the sub-address is deleted and the recall is made. However, there is a network, depending on the type of ISDN, which interpretes sub-address =0 as no sub-address designation. In such a case, the recall may be made with the dial number with sub-address =0. In the present embodiment, when the negative CONN command is received, the recall is made. Alternatively, a negation reason code contained in the negative CONN command may be analyzed so that the recall is made only when the connection is permitted if the dial number is not accompanied with the sub-address.

As described above, when the calling terminal calls by the dial number with the sub-address and cannot success the connection, the calling terminal automatically changes it to the dial number without the sub-address and recalls. Accordingly, even if the sub-address of the called terminal has been changed, the connection is made to the called terminal without the intervention of the calling station operator.

A sixth embodiment in which channel status of the ISDN is displayed is explained.

Figure 13:
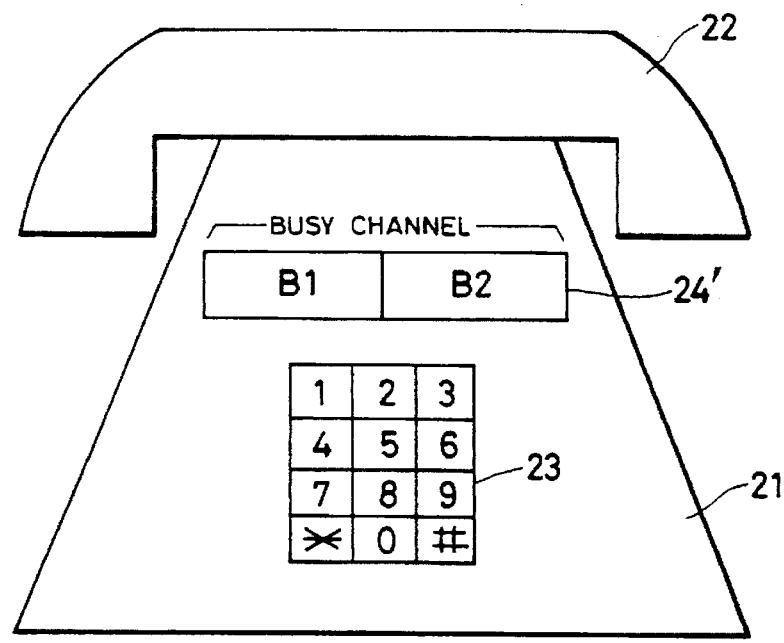
FIG. 13 shows an external view of a digital telephone set of a sixth embodiment.

FIG. 13 shows an external view of a digital telephone set of the sixth embodiment. Numeral 21 denotes a digital telephone set body, numeral 22 denotes a handset, numeral 23 denotes key buttons for inputting a telephone number, and numeral 24' denotes lamps for indicating a busy B channel.

Figure 14:
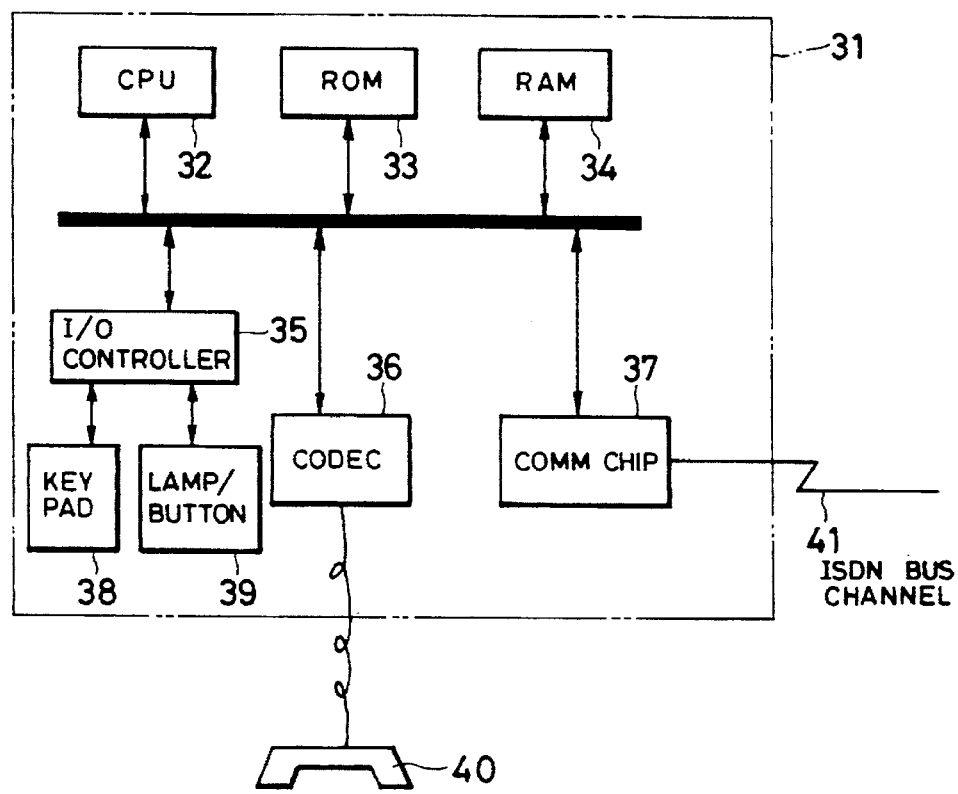
FIG. 14 shows a block diagram of the digital telephone set of the sixth embodiment.

FIG. 14 shows a block diagram of the present embodiment.

The present embodiment comprises a digital telephone set body 31 and a handset 40 which is a speech transmitter/receiver. The digital telephone set body 31 comprises a CPU 32, a ROM 33, a RAM 34, a communication chip 37, an I/O controller 35, a codec 36 for analog/digital conversion, a key pad 38 and a lamp 39'. The CPU 32 controls the digital telephone set body 31, the ROM 33 contains a control program in accordance with a flow chart of FIG. 16, and the RAM 34 stores communication data.

Figure 15:
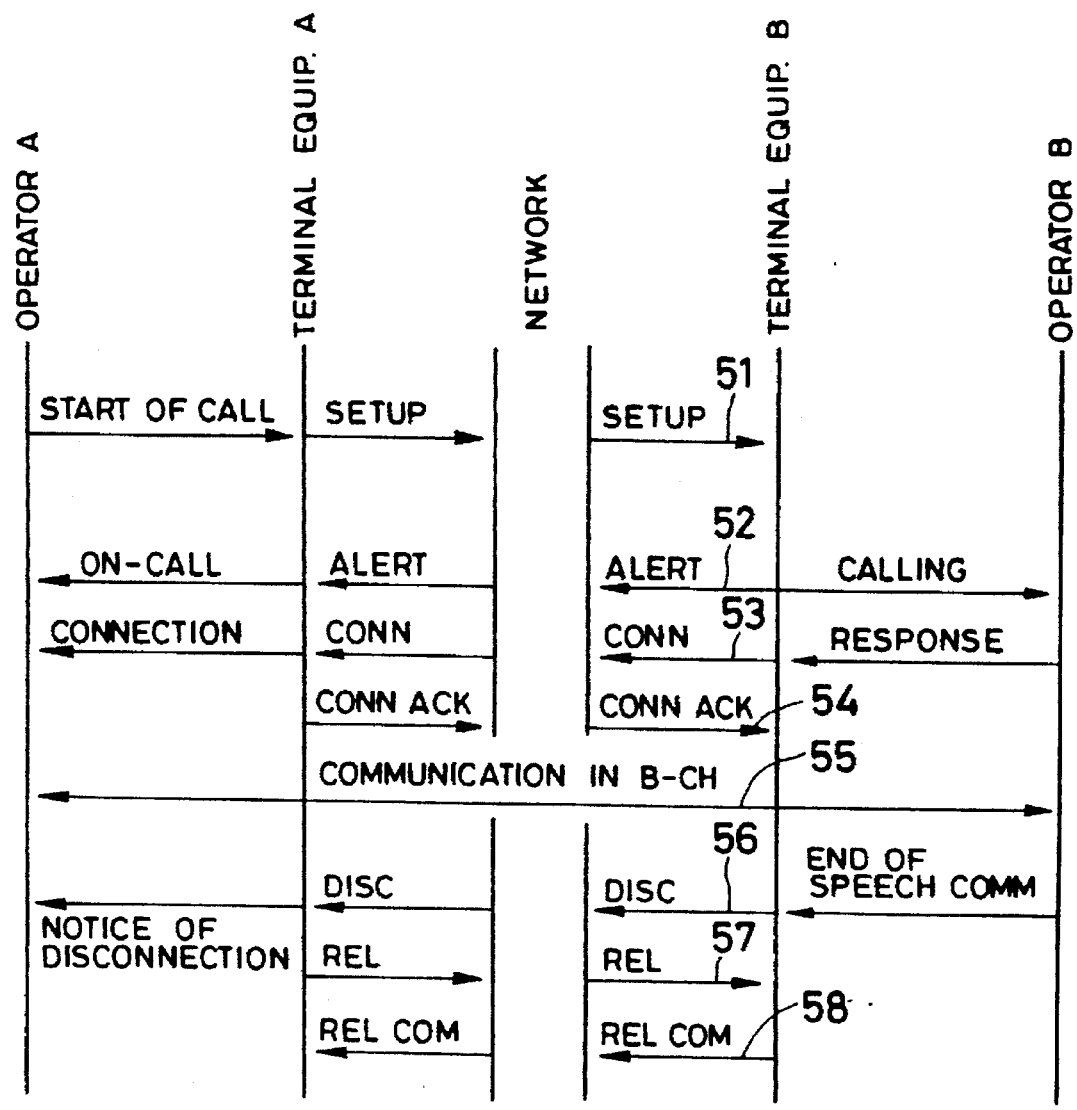
FIG. 15 shows a signal sequence of the digital telephone set of the sixth embodiment.

FIG. 15 shows a signal sequence of the digital telephone in the ISDN network. In the called terminal B of FIG. 15, numeral 51 denotes a call request command (SET UP), numeral 52 denotes a calling command (ALERT), numeral 53 denotes a response command (CONN), numeral 54 denotes a connection completion command (CONN ACK), numeral 55 denotes speech data (B-CH signal), numeral 56 denotes a disconnection command (DISC), numeral 57 denotes a recovery request command (REL), and numeral 58 denotes a recovery confirmation command (REL COM). FIG. 15 is identical to FIG. 4.

Figure 16:
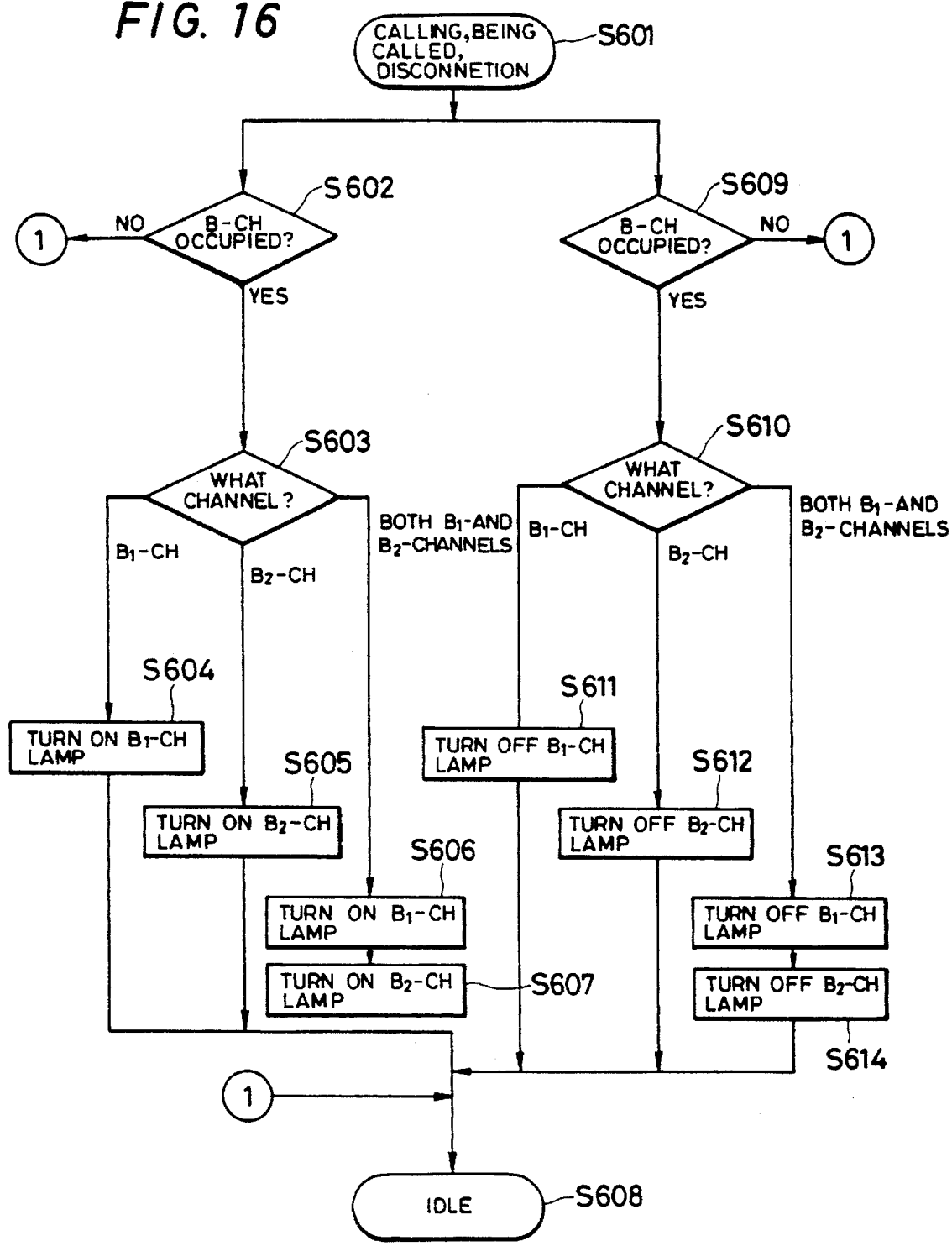
FIG. 16 shows a flow chart of a control operation of the digital telephone set of the sixth embodiment.

The operation of the present embodiment is explained. FIG. 16 shows a flow chart of the operation of the embodiment.

In a step S601, whether the terminal connected to the same subscriber line to that of its own terminal has called by the SETUP command 51 of FIG. 15 or has been disconnected by the REL COM command 58 of FIG. 15 is checked.

If the call has been made, whether the call uses the B channel or not is checked by the signal sequence in a step S602. If it does not use the B channel, the terminal becomes idle in a step S608.

If the call uses the B channel, the particular B channel to be used is determined in a step S603. If only the B1 channel is to be used, the B1 channel lamp 24' of FIG. 13 is turned on in a step S604.

If only the B2 channel is to be used, the B2 channel lamp 24' of FIG. 13 is turned on in a step S605. If both the B1 and B2 channels are to be used in the step S603, the B1 channel lamp 24' of FIG. 13 is turned on in a step S606 and the B2 channel lamp 24' of FIG. 13 is turned on in a step S607.

After the steps S604, S605 and S607, the digital telephone set of the present embodiment becomes idle in a step S608.

If the disconnection is detected in the step S601, whether the call has used the B channel or not is determined in a step S609. If it has not used the B channel, the telephone set becomes idle in the step S608. If it has used the B channel, the particular B channel used is determined in a step S610. If only the B1 channel has been used, the B1 channel lamp 24' of FIG. 13 is turned off in a step S611. If only the B2 channel has been used in the step S610, the B2 channel lamp 24' of FIG. 13 is turned off in a step S612. If both the B1 and B2 channels have been used in the step S610, the B1 channel lamp is turned off in a step S613 and the B2 channel lamp is turned off in a step S614.

After the steps S611, S612 and S614, the digital telephone set becomes idle in the step S608.

In the present embodiment, the busy B channel is indicated by the lamp. Alternatively, it may be displayed by characters by using an LCD.

As described above, the digital telephone set for the ISDN network is provided with the function to indicate the use status of the B channel to which the telephone set is connected, by the lamps. Accordingly, the operator, when he/she calls, can readily check whether the line is available or not.

In the present embodiment, the ISDN network is used although the present invention is not limited to the ISDN but is applicable to any conventional public line (telephone line or digital line) to which a plurality of communication apparatus are connected.

In the present embodiment, the digital telephone set is used. However, telephone sets, facsimile machines, teletexes, telexes, personal computers and other communication apparatus may be connected to the ISDN network and the present invention is not limited to the digital telephone set but is applicable to various other communication apparatus.

The present invention is not limited to the illustrated embodiments but various modifications thereof may be made.

We claim:

1. A communication apparatus communicating via a digital communication line which has a control channel and a plurality of data channels, comprising:

conversion means for converting digital voice data from the data channels of the digital communication line to analog voice signals;

output means for outputting the analog voice signals as audible tones, discriminating means for discriminating states of the plurality of data channels on the basis of signals of the control channel, and generating means for generating analog voice signals indicating the states of the plurality of data channels in accordance with a discrimination result by said discriminating means, and for causing said output means to output the analog voice signals indicating the states of the plurality of data channels as audible tones.

2. A communication apparatus according to claim 1, wherein said communication apparatus is connected to the digital communication line via a line control unit which connects other communication apparatus to the digital communication line.

3. A communication apparatus according to claim 1, wherein the digital communication line is a line of an integrated services digital network.

4. A communication apparatus according to claim 1, wherein the signals of the control channel include a call command and a disconnect command.

5. A communication apparatus according to claim 1, wherein said generating means generates a voice message indicating the states of the plurality of data channels.

6. A communication apparatus according to claim 1, wherein said generating means generates a predetermined tone signal.

7. A communication apparatus used in a communication system in which a plurality of communication terminals use at least a communication line in common, comprising:
    detecting means for detecting a state of the communication line;
    generation means for generating a communication request; and
    informing means responsive to the communication request for informing an operator of said communication apparatus, in accordance with a detection result by said detecting means, that the communication line is available,
    wherein in a case where the communication line is busy when the communication request is generated, said informing means monitors the state of the communication line and, when the communication line becomes available, informs that the communication line is available.

8. A communication apparatus according to claim 7, wherein said informing means informs of the availability of the communication line by sound.

9. A communication apparatus according to claim 7, further comprising a handset for speech communication.

10. A communication apparatus according to claim 7, wherein the communication line has a control channel and a plurality of data channels.

11. A communication apparatus according to claim 7, wherein the communication system has a line control unit for connecting, to the communication line, a bus line to which the communication terminals are connected, and
    said detecting means detects the state of the communication line in accordance with a signal of the bus line.

12. A communication apparatus used in a communication system which has a line control unit for connecting, to a communication line having a control channel and a plurality of data channels, a bus line to which a plurality of communication terminals are connected, and in which the plurality of communication terminals use the communication line in common, comprising:
    monitoring means for monitoring signals of the bus line;
    discriminating means for discriminating states of the plurality of data channels in accordance with the signals of the bus line; and
    display means for displaying the states of the plurality of data channels in accordance with a discrimination result by said discriminating means.

13. A communication apparatus according to claim 12, wherein said display means displays each state of the plurality of data channels.

14. A communication apparatus according to claim 12, further comprising a handset for speech communication.

15. A communication apparatus according to claim 12, wherein the communication line is a line of an integrated services digital network.

16. A communication apparatus according to claim 12, wherein the signals of the bus line include a call command and a disconnect command.

17. A communication apparatus used in a communication system which has a line control unit for connecting, to a communication line having a control channel and a plurality of data channels, a bus line to which a plurality of communication terminals are connected, and in which the plurality of communication terminals use the communication line in common, comprising:
    monitoring means for monitoring signals of the bus line;
    discriminating means for discriminating states of the plurality of data channels in accordance with the signals of the bus line; and
    informing means for informing an operator of the states of the plurality of data channels in accordance with a discrimination result by said discriminating means.

18. A communication apparatus according to claim 17, further comprising a handset for speech communication.

19. A communication apparatus according to claim 17, wherein the communication line is a line of an integrated services digital network.

20. A communication apparatus according to claim 17, wherein the signals of the bus line include a call command and a disconnect command.

21. A communication apparatus according to claim 17, wherein said informing means comprises generating means for generating a sound indicating the states of the plurality of data channels.

22. A communication apparatus according to claim 17, wherein said informing means comprises display means for displaying the states of the plurality of data channels.

23. A method of operating a communication apparatus communicating via a digital communication line which has a control channel and a plurality of data channels, comprising the steps of:
    converting digital voice data from the data channels of the digital communication line to analog voice signals;
    outputting the analog voice signals as audible tones,
    discriminating states of the plurality of data channels on the basis of signals of the control channel, and
    generating analog voice signals indicating the states of the plurality of data channels in accordance with a discrimination result by said discriminating step, and for causing said output step to output the analog voice signals indicating the states of the plurality of data channels as audible tones.

24. A method according to claim 23, wherein the communication apparatus is connected to the digital communication line via a line control unit which connects other communication apparatus to the digital communication line.

25. A method according to claim 23, wherein the digital communication line is a line of an integrated services digital network.

26. A method according to claim 23, wherein the signals of the control channel include a call command and a disconnect command.

27. A method according to claim 23, wherein said generating step generates a voice message indicating the states of the plurality of data channels.

28. A method according to claim 23, wherein said generating step generates a predetermined tone signal.

29. A method of operating a communication apparatus used in a communication system in which a plurality of communication terminals use at least a communication line in common, comprising the steps of:

detecting a state of the communication line;

generating a communication request; and responsive to the communication request, informing an operator of the communication apparatus, in accordance with a detection result by said detecting step, that the communication line is available, wherein in a case where the communication line is busy when the communication request is generated, said informing step monitors the state of the communication line and, when the communication line becomes available, informs that the communication line is available.

30. A method according to claim 29, wherein said informing step informs of the availability of the communication line by sound.

31. A method according to claim 29, wherein the communication apparatus comprises a handset for speech communication.

32. A method according to claim 29, wherein the communication line has a control channel and a plurality of data channels.

33. A method according to claim 29, wherein the communication system has a line control unit for connecting, to the communication line, a bus line to which the communication terminals are connected, and said detecting step detects the state of the communication line in accordance with a signal of the bus line.

34. A method of operating a communication apparatus used in a communication system which has a line control unit for connecting, to a communication line having a control channel and a plurality of data channels, a bus line to which a plurality of communication terminals are connected, and in which the plurality of communication terminals use the communication line in common, comprising the steps of:

monitoring signals of the bus line;

discriminating states of the plurality of data channels in accordance with the signals of the bus line; and displaying the states of the plurality of data channels in accordance with a discrimination result by said discriminating step.

35. A method according to claim 34, wherein said display step displays each state of the plurality of data channels.

36. A method according to claim 34, wherein the communication apparatus comprises a handset for speech communication.

37. A method according to claim 34, wherein the communication line is a line of an integrated services digital network.

38. A method according to claim 34, wherein the signals of the bus line include a call command and a disconnect command.

39. A method used in a communication system which has a line control unit for connecting, to a communication line having a control channel and a plurality of data channels, a bus line to which a plurality of communication terminals are connected, and in which the plurality of communication terminals use the communication line in common, comprising the steps of:

monitoring signals of the bus line;

discriminating states of the plurality of data channels in accordance with the signals of the bus line; and informing an operator of the states of the plurality of data channels in accordance with a discrimination result by said discriminating step.

40. A method according to claim 39, wherein the communication apparatus comprises a handset for speech communication.

41. A method according to claim 39, wherein the communication line is a line of an integrated services digital network.

42. A method according to claim 39, wherein the signals of the bus line include a call command and a disconnect command.

43. A method according to claim 39, wherein said informing step comprises a generating step of generating a sound indicating the states of the plurality of data channels.

44. A method according to claim 39, wherein said informing step comprises a display step of displaying the states of the plurality of data channels.

* * * * *

UNITED STATES PATENT AND TRADEMARK OFFICE
CERTIFICATE OF CORRECTION

PATENT NO. : 5,648,971
DATED : July 15, 1997
INVENTOR(S) : YUKIHIKO OGATA, ET AL.

It is certified that error appears in the above-identified patent and that said Letters Patent is hereby corrected as shown below:

TITLE PAGE: AT [56] REFERENCES CITED
U.S. PATENT DOCUMENTS

"... 10/1981 ... O'Neil et al. ... 379/164" should read --4,296,282  10/1981  O'Neil et al. ... 379/164--.

COLUMN 3

Line 28, "pod 38" should read --pad 38--.

COLUMN 5

Line 54, "calls are" should read --call is--.

COLUMN 6

Line 30, "and" should read --he--.

COLUMN 9

Line 21, "success" should read --make--.

Signed and Sealed this

Seventh Day of July, 1998

Attest:

BRUCE LEHMAN

Attesting Officer           Commissioner of Patents and Trademarks